United States Patent
Kodaka et al.

(10) Patent No.: US 8,373,711 B2
(45) Date of Patent: Feb. 12, 2013

(54) IMAGE PROCESSING APPARATUS, IMAGE PROCESSING METHOD, AND COMPUTER-READABLE STORAGE MEDIUM

(75) Inventors: Takeshi Kodaka, Kamakura (JP); Nobuhiro Nonogaki, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1230 days.

(21) Appl. No.: 11/946,419

(22) Filed: Nov. 28, 2007

(65) Prior Publication Data

US 2008/0297522 A1 Dec. 4, 2008

(30) Foreign Application Priority Data

Dec. 12, 2006 (JP) ................. 2006-334249

(51) Int. Cl.
*G06T 1/00* (2006.01)
(52) U.S. Cl. ............ 345/522; 345/505; 375/240.24; 382/232; 382/234
(58) Field of Classification Search .......... 345/522, 345/505; 375/240.24; 382/232, 234
See application file for complete search history.

(56) References Cited

U.S. PATENT DOCUMENTS 7,660,352 B2 * 2/2010 Yamane et al. .......... 375/240.12
7,881,541 B2 * 2/2011 Kashima et al. ............ 382/232
7,881,542 B2 * 2/2011 Kashima et al. ............ 382/232

FOREIGN PATENT DOCUMENTS

JP 2005-189975 7/2005
JP 2006-221567 8/2006

OTHER PUBLICATIONS

Japanese Office Action issued Jul. 1, 2011, in Patent Application No. 2006-334249 (with English-language translation).
U.S. Appl. No. 12/032,404, filed Feb. 15, 2008, Nonogaki, et al.

* cited by examiner

*Primary Examiner* — Daniel Washburn
(74) *Attorney, Agent, or Firm* — Oblon, Spivak, McClelland, Maier & Neustadt, L.L.P.

(57) ABSTRACT

An image processing apparatus has a memory in which a plurality of image processing commands are stored, a dependent information producing unit which produces dependent information in each image data block becoming a target image processing, the dependent information indicating a dependency relationship between image processing of the image data block and another processing, a dependency relationship solving unit which makes a determination of a practicable image processing based on the dependent information, the dependency relationship solving unit writing an image processing command of the practicable image processing in the memory, and a plurality of image processing units which read an image processing command stored in the memory, the image processing units performing the image processing to the image data block based on the image processing command.

13 Claims, 8 Drawing Sheets

IMAGE PROCESSING APPARATUS, IMAGE PROCESSING METHOD, AND COMPUTER-READABLE STORAGE MEDIUM

CROSS-REFERENCE TO RELATED APPLICATION

This application is based upon and claims the benefit of priority from the prior Japanese Patent Application No. 2006-334249, filed on Dec. 12, 2006; the entire contents of which are incorporated herein by reference.

BACKGROUND OF THE INVENTION

The present invention relates to an image processing apparatus, an image processing method, and a computer-readable storage medium, particularly to the image processing apparatus, image processing method and computer-readable storage medium for enabling efficient parallel processing.

Conventionally, in a multi-core system used in audio and visual applications including a plurality of processors for performing image processing and sound processing, processing efficiency is enhanced by pipeline processing of using a plurality of processors to which processing contents are previously allocated. However, with recent diversification of a method for processing medium dealt with, the processing efficiency is lowered rather than enhanced when the processing contents are previously allocated to the plurality of processors.

On the other hand, in an image processing apparatus disclosed in Japanese Patent Application Laid-Open No. 2005-189975, the plurality of processors do not perform the previously-allocated processing, but selectively perform the processing to segments (image data divided into predetermined sizes) in the order registered in a process queue. After performing processing to one segment, the processor of the image processing apparatus disclosed in Japanese Patent Application Laid-Open No. 2005-189975 can perform processing to another segment to which another processor already performs processing. This enables the processing efficiency to be enhanced compared with the pipeline processing. However, because the processor of the Japanese Patent Application Laid-Open No. 2005-189975 performs the processing according to the order registered in the process queue, the processor cannot perform the processing registered in the process queue until another processing is completed in the case where a dependency relationship exists between a plurality of processings registered in the process queue and another processing. Therefore, there is a problem in that parallelism of the plural processors cannot efficiently be utilized.

Thus, in the conventional image processing apparatus, not only the plurality of processors cannot efficiently be operated to perform the image processing, but also the parallelism of the plurality of processors cannot efficiently be utilized.

BRIEF SUMMARY OF THE INVENTION

According to the first aspect of the present invention, an image processing apparatus comprising: a memory in which a plurality of image processing commands stored; a dependent information producing unit which produces dependent information in each image data block becoming a target image processing, the dependent information indicating a dependency relationship between image processing of the image data block and another processing; a dependency relationship solving unit which makes a determination of a practicable image processing based on the dependent information, the dependency relationship solving unit writing an image processing command of the practicable image processing in the memory; and a plurality of image processing units which read an image processing command stored in the memory, the image processing units performing the image processing to the image data block based on the image processing command.

According to the second aspect of the present invention, an image processing method for concurrently performing a plurality of image processings in each image data block, the image processing method comprising: producing dependent information in each image data block becoming a target image processing, the dependent information indicating a dependency relationship between image processing of the image data block and another processing; writing the dependent information in a memory; making a determination of a practicable image processing based on the dependent information written in the memory; writing an image processing command of image processing in the memory, the determination that the image processing is a practicable image processing being made; and performing the image processing based on the image processing command written in the memory.

According to the third aspect of the present invention, a computer-readable storage medium, wherein a dependent information producing program which produces dependent information in each image data block becoming a target image processing, the dependent information indicating a dependency relationship between image processing of the image data block and another processing; a dependency relationship solving program which makes a determination of a practicable image processing based on the dependent information, the dependency relationship solving program writing an image processing command of the practicable image processing in the memory; and a plurality of image processing programs which read an image processing command stored in the memory, the image processing programs performing the image processing to the image data block based on the image processing command are stored in the computer-readable storage medium.

DETAILED DESCRIPTION OF THE INVENTION

An exemplary embodiment of the present invention will be described below with reference to the drawings. The following embodiment of the present invention is described by way of example only, and the scope of the present invention is not limited to the embodiment.

Figure 1:
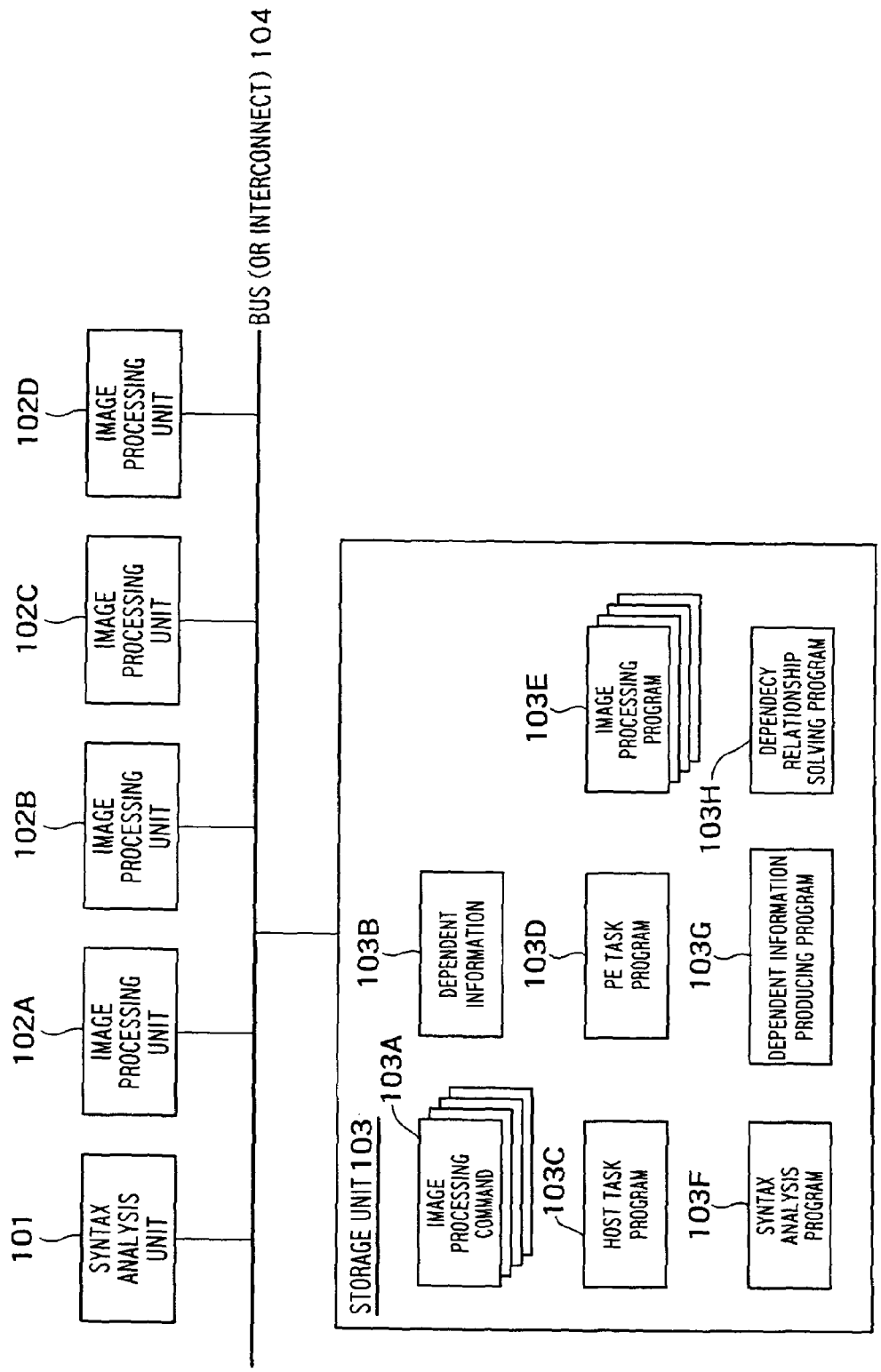
FIG. 1 is a block diagram showing a configuration of an image processing apparatus according to an embodiment of the present invention.

FIG. 1 is a block diagram showing a configuration of an image processing apparatus according to an embodiment of the present invention The image processing apparatus according to an embodiment of the present invention has a function as a decoder. Image data coded in a bit stream is inputted to the decoder, and the decoder outputs decoded image data which is displayed in a predetermined output device (for example, liquid crystal display). The image processing apparatus includes a syntax analysis unit 101, image processing units 102A to 102D, and a memory 103. The units are connected to one another through a bus (or interconnect) 104.

An image processing command 103A, a dependent information 103B, a HOST task program 103C, a PE task program 103D, an image processing program 103E, a syntax analysis program 103F, a dependent information producing program 103G, and a dependency relationship solving program 103H are stored in the memory 103.

The image processing command 103A is a command concerning which image processing should be performed (namely, which image processing program 103E should be run), and the image processing command 103A is written in the form of a data string having a queue structure. In a embodiment of the present invention, the practicable (dependency relationship with other image processing is solved) image processing command 103A is stored in the memory 103.

The dependent information 103B is information which is produced in dependent information producing processing (see FIG. 4), and the dependent information 103B includes a dependent information field (see FIG. 8) in each macro block. The dependent information field includes a solution state (whether or not input data necessary for one image processing is outputted as output data of the syntax analysis processing or another image processing) of the dependency relationship between one image processing and syntax analysis processing or another image processing.

Figure 8:
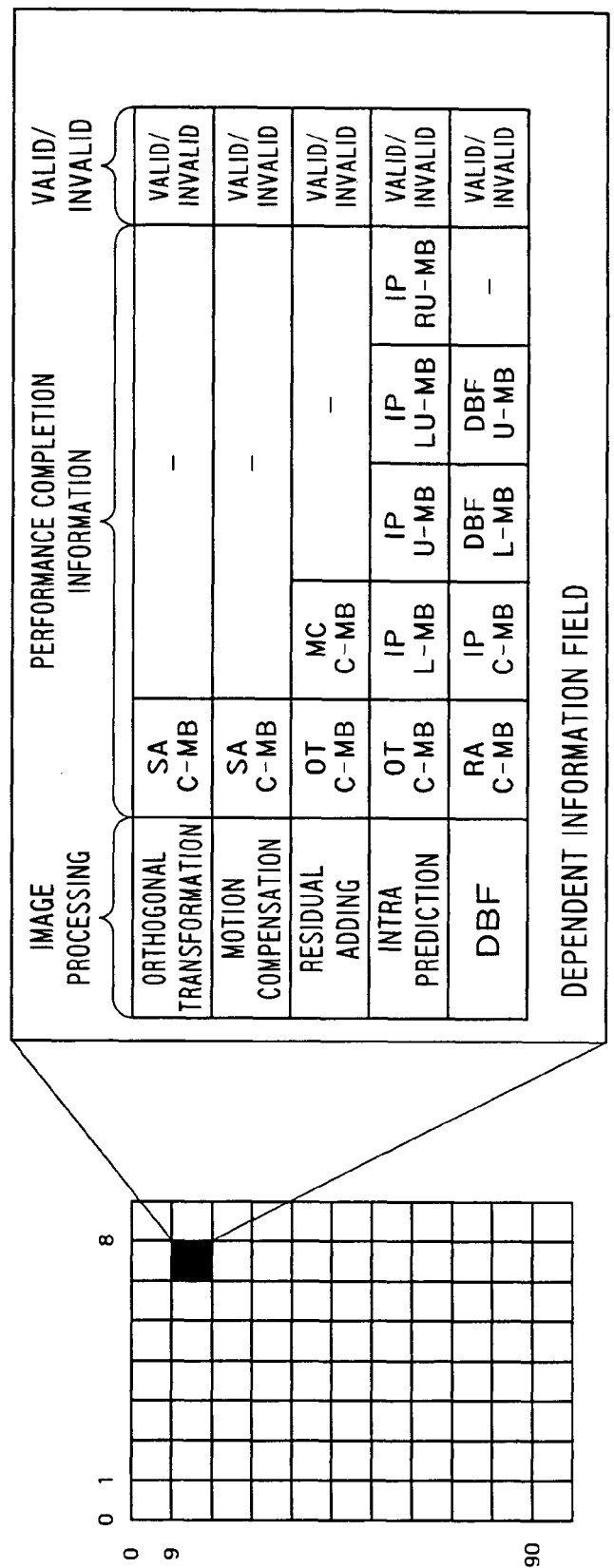
FIG. 8 is a view showing an example of a dependent information field according to an embodiment of the present invention.

FIG. 8 is a view showing an example of the dependent information field of an embodiment of the present invention. The dependent information field of FIG. 8 includes three items of "IMAGE PROCESSING", "PERFORMANCE COMPLETION INFORMATION", and "VALIDATION/INVALIDATION". The image processing performed to one macro block is set in the "IMAGE PROCESSING". A position of the macro block having the dependency relationship with the processing (syntax analysis processing or image processing) having the dependency relationship is set in the "PERFORMANCE COMPLETION INFORMATION". As described later, whether or not the processing having the dependency relationship is already performed is also set in the "PERFORMANCE COMPLETION INFORMATION". The case in which "ALREADY PERFORMED" is set to all processing in a column direction for one image processing shall mean that the image processing is enabled to be performed. Validation or invalidation of the image processing is set in the "VALIDATION/INVALIDATION". The image processing is not enabled to be performed while the "INVALIDATION" is set.

That is, the dependent information field of FIG. 8 shows that orthogonal transformation processing and motion compensating processing depend on the syntax analysis processing performed to the target macro block. The dependent information field also shows that residual adding processing depends on the orthogonal transformation and motion compensating processing which are performed to the target macro block. The dependent information field also shows that intra predicting processing depends on the orthogonal transformation processing performed to the target macro block and the intra predicting processing performed to the left, upper, upper-left, and upper-right macro blocks. The dependent information field also shows that DBF processing depends on the residual adding processing and intra predicting processing which are performed to the target macro block and the DBF processing performed to the left and upper macro blocks.

The HOST task program 103C is a program module which performs HOST task processing (see FIG. 3) for making a request of performing the image processing, and the HOST task program 103C is run by the syntax analysis unit 101.

The PE task program 103D is a program module which receives the request of performing the image processing, made by the HOST task processing, to perform the image processing. The PE task program 103D is also a program module which performs PE task processing (see FIG. 6) for making a request of performing another image processing. The PE task program 103D is run by each of the image processing units 102A to 102D.

The image processing program 103E is a program module which performs image processing (see FIGS. 2B to 2F) corresponding to the image processing command 103A, and the image processing program 103E is run by each of the image processing units 102A to 102D.

The syntax analysis program 103F is a program module which performs the syntax analysis processing (see FIG. 2A), and the syntax analysis program 103F is run by the syntax analysis unit 101.

The dependent information producing program 103G is a program module which performs dependent information producing processing, and the dependent information producing program 103G is called in the HOST task processing.

The dependency relationship solving program 103H is a program module which performs dependency relationship solving processing (1) and (2) (see FIGS. 5 and 7), and the dependency relationship solving program 103H is called in the HOST task processing or PE task processing.

An H.264 decoder is cited as an example of a decoder function of the image processing apparatus according to an embodiment of the present invention. In the H.264 decoder, an example of the syntax analysis processing includes H.264/AVC Syntax analysis processing, and examples of the image processing include the intra predicting processing, the orthogonal transformation processing, the motion compensating processing, the residual adding processing, and de-blocking filter (DBF) processing. In the H.264 decoder, decoding is performed in a block unit called macro block. Either "INTRA PREDICTION, I" for performing the intra predicting processing or "INTER PREDICTION, P" for performing the motion compensating processing is selected in each macro block based on a parameter specified by a stream, and the decoding is performing according to the selected processing flow.

FIGS. 2A to 2F are schematic views showing the input data and output data of processing in the image processing apparatus according to an embodiment of the present invention.

Figure 2:
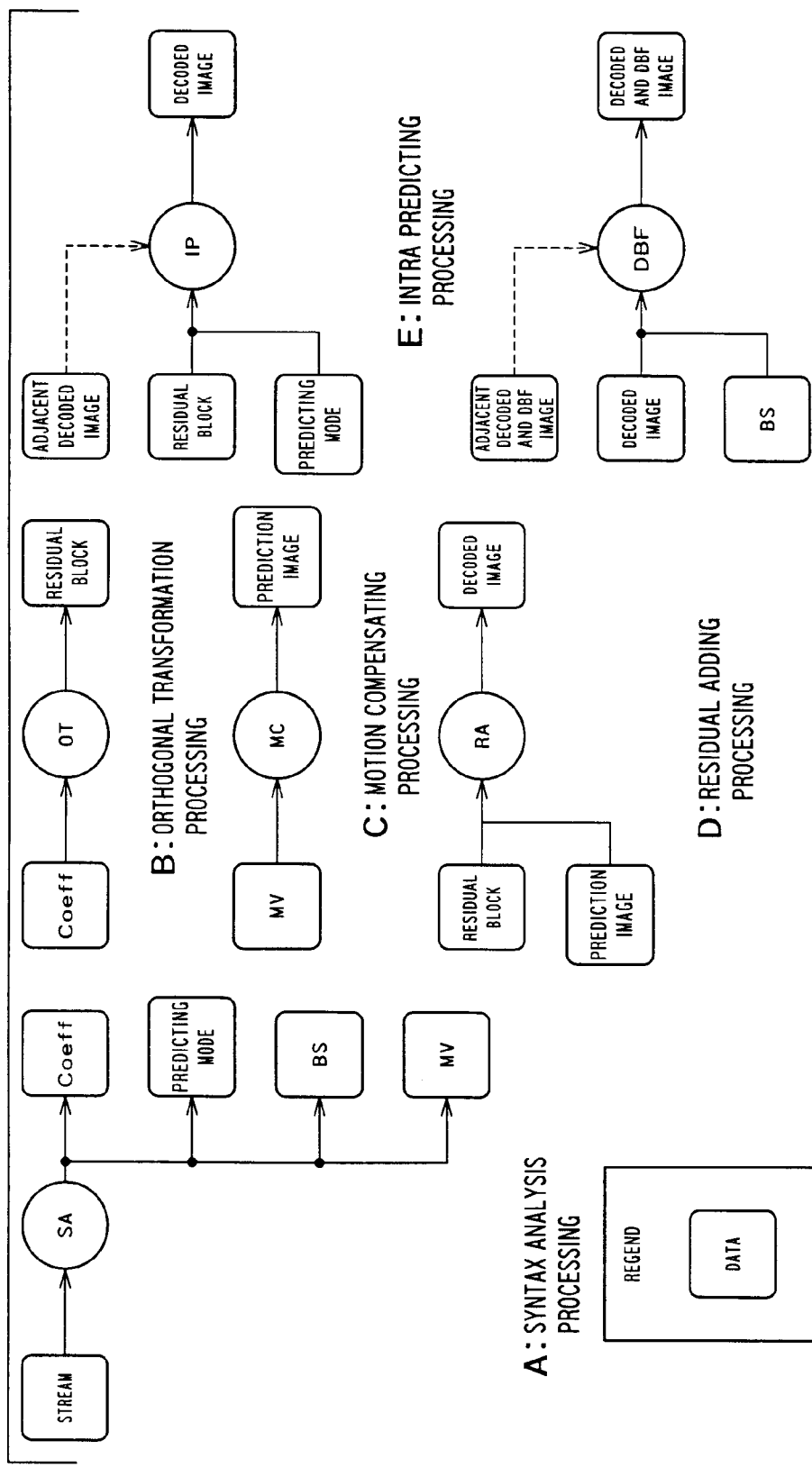
FIGS. 2A to 2F are schematic views showing input data and output data of processing in the image processing apparatus according to an embodiment of the present invention.

As shown in FIG. 2A, the syntax analysis processing is performed while a coding image stream is set to the input data, and a matrix of coefficients (Coeff) used in the orthogonal transformation processing is set to the output data. A prediction mode is set to the output data when the intra predicting mode is selected, and a BS value (operation mode of DBF processing) and a motion vector are set to the output data when the inter predicting mode is selected.

As shown in FIG. 2B, in the orthogonal transformation processing, the matrix of coefficients (Coeff) of the macro block is set to the input data, the orthogonal transformation and inverse quantization are performed, and a residual block is set to the output data.

As shown in FIG. 2C, in the motion compensating processing, the motion vector is set to the input data, the motion compensation is performed based on a reference image, and the prediction image is set to the output data.

As shown in FIG. 2D, in the residual adding processing, the residual block and the prediction image are set to the input data, the pixels of the residual block and prediction image are added, and the decoded image is set to the output data.

As shown in FIG. 2E, in the intra predicting processing, the residual blocks, the macro blocks processed in the predicting mode and the decoded images of the adjacent macro blocks (for example, left, upper, upper-right, and upper-left macro blocks) are set to the input data, the intra predicting mode is performed, and the decoded image of the target macro block is set to the output data. The number of adjacent macro blocks or directions of the adjacent macro blocks are arbitrarily determined.

As shown in FIG. 2F, the DBF processing is performed while the decoded image and the decoded images to which the DBF processing is already performed in the adjacent macro blocks are set to the input data, and the decoded image to which the DBF processing is already performed in the target macro block is set to the output data.

Figure 3:
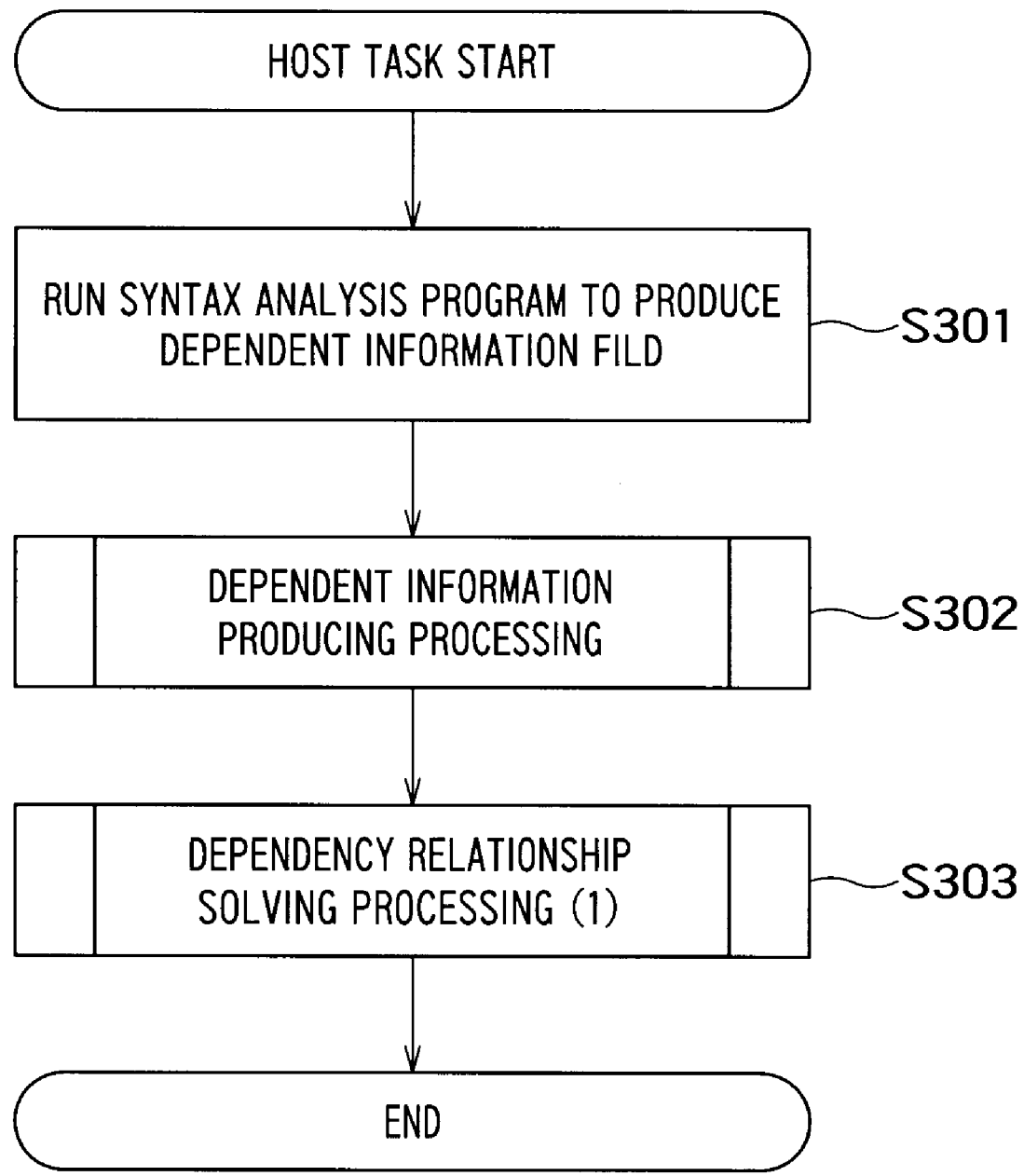
FIG. 3 is a flowchart showing a processing procedure of a syntax analysis unit in HOST task processing according to an embodiment of the present invention.

FIG. 3 is a flowchart showing a processing procedure of the syntax analysis unit 101 in the HOST task processing according to an embodiment of the present invention. The syntax analysis unit 101 runs the HOST task program 103C to perform the HOST task processing.

The syntax analysis program 103F stored in the memory 103 is run to perform the syntax analysis processing, and the dependent information field is produced in each macro block shown in FIG. 8 (S301). Then, the dependent information producing program 103G is run to perform the dependent information producing processing shown in FIG. 4 (S302). Then, the dependency relationship solving program 103H is run to perform the dependency relationship solving processing (1) shown in FIG. 5 (S303).

Figure 4:
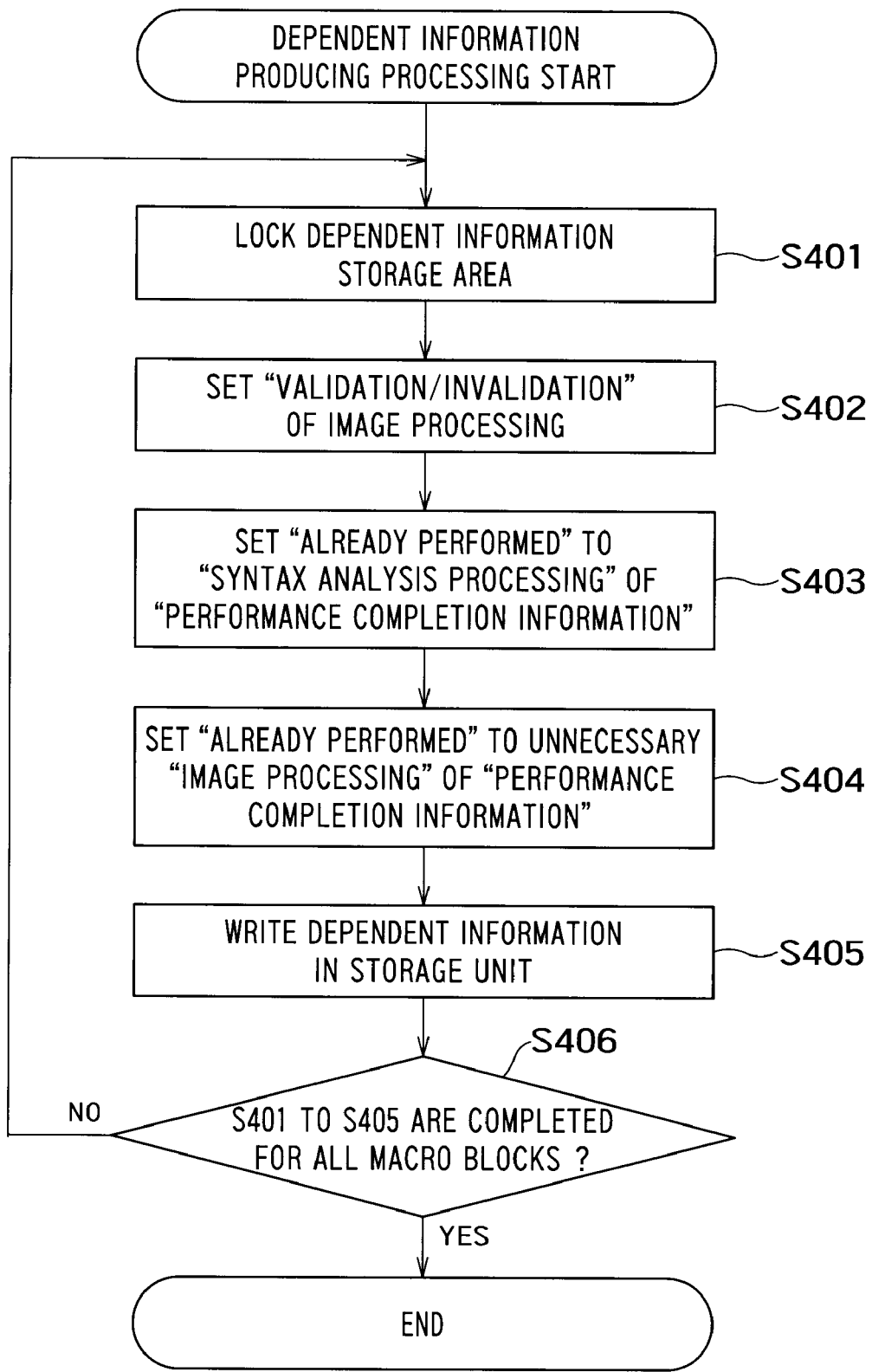
FIG. 4 is a flowchart showing a processing procedure of the syntax analysis unit 101 in dependent information producing processing according to an embodiment of the present invention.

FIG. 4 is a flowchart showing a processing procedure of the syntax analysis unit 101 in the dependent information producing processing according to an embodiment of the present invention. The syntax analysis unit 101 runs the dependent information producing program 103G to perform the dependent information producing processing.

The dependent information 103B stored in the memory 103 is locked (S401). S401 is performed to prevent the image processing units 102A to 102D operating in parallel with the syntax analysis unit 101 from referring to the dependent information 103B in performing the dependent information producing processing and dependency relationship solving processing (1). Then, the "VALIDATION/INVALIDATION" of the dependent information field is set according to the result of the syntax analysis processing (S301 of FIG. 3) and the position of the macro block (S402). Then, the "ALREADY PERFORMED" is set to the "SYNTAX ANALYSIS PROCESSING" of the "PERFORMANCE COMPLETION INFORMATION" (S403). Then, the "ALREADY PERFORMED" is set to the unnecessary image processing of the "PERFORMANCE COMPLETION INFORMATION" based on the output data of the syntax analysis processing and the position of the macro block (S404). S402 to S404 are performed based on an algorithm of the dependent information producing program 103. Then, the dependent information field in which S401 to S404 are completed is written as the dependent information 103B in the memory 103 (S405). S401 to S405 are repeated until S401 to S405 are performed for all the macro blocks (S406).

Figure 5:
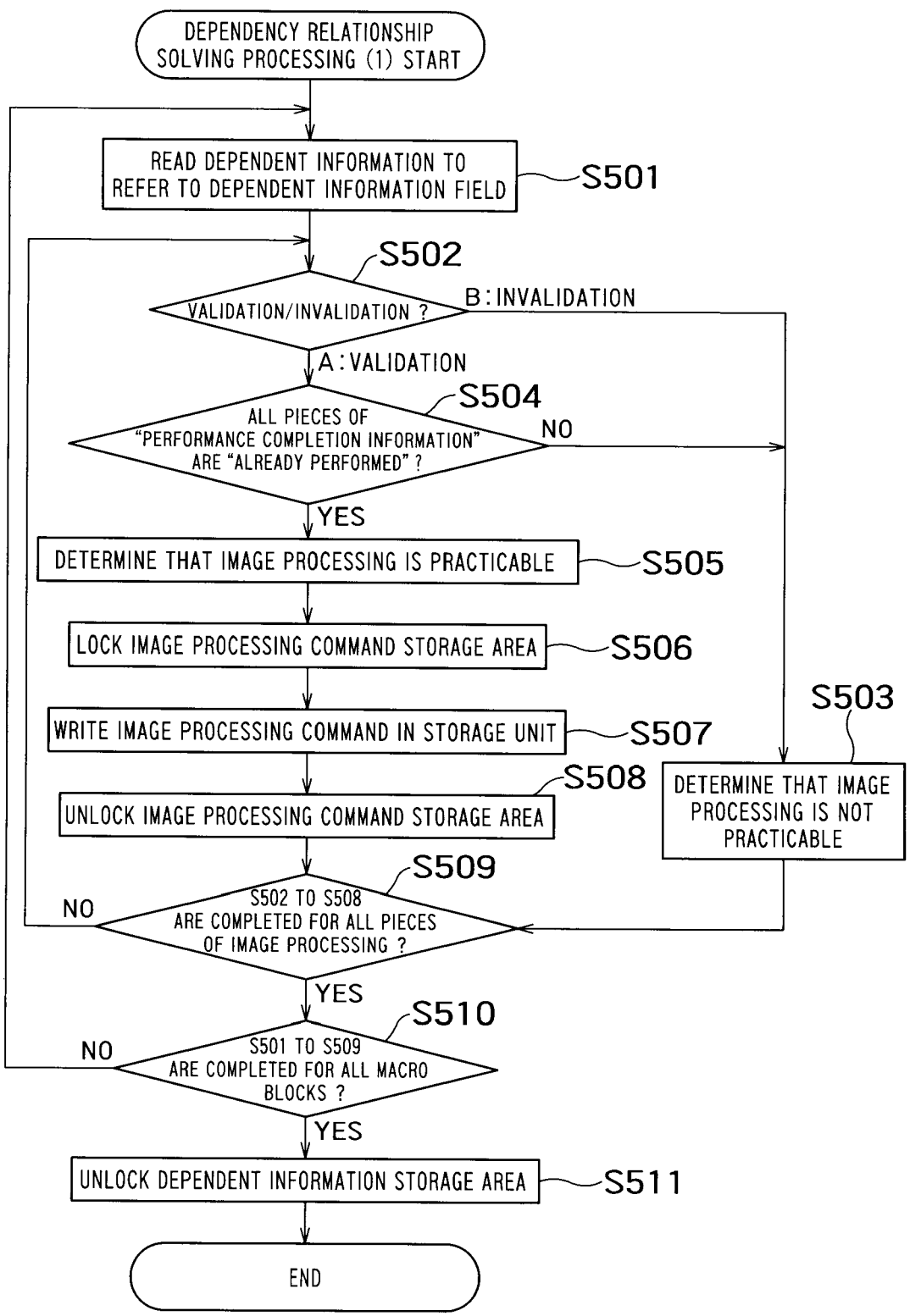
FIG. 5 is a flowchart showing a processing procedure of the syntax analysis unit 101 in dependency relationship solving processing (1) according to an embodiment of the present invention.

FIG. 5 is a flowchart showing a processing procedure of the syntax analysis unit in the dependency relationship solving processing (1) according to an embodiment of the present invention. The syntax analysis unit 101 runs the dependency relationship solving program 103H to perform the dependency relationship solving processing (1).

The dependent information 103B is read from the memory 103 to refer to the dependent information field (S501). Then, the syntax analysis unit 101 determines whether the validation or invalidation is set to the "VALIDATION/INVALIDATION" (S502).

For the image processing in which the "INVALIDATION" is set (A: INVALIDATION in S502), the syntax analysis unit 101 determines that the image processing is not practicable (S503).

On the other hand, for the image processing in which the "VALIDATION" is set (B: VALIDATION in S502), the syntax analysis unit 101 determines whether or not all "PERFORMANCE COMPLETION INFORMATION" are "ALREADY PERFORMED" (S504).

For the image processing in which all "PERFORMANCE COMPLETION INFORMATION" are "ALREADY PERFORMED", the syntax analysis unit 101 determines that the image processing is practicable (YES in S504 and S505). Then, the image processing command 103A stored in the memory 103 is locked (S506). S506 is performed to prevent the image processing units 102A to 102D from reading and writing the image processing command 103A during the performance of the dependency relationship solving processing. Then, the syntax analysis unit 101 writes the image processing command 103A in the memory 103, and the syntax analysis unit 101 notifies other image processing units 102A to 102D that the image processing command 103A is written in the memory 103 (S507). Then, the image processing command 103A of the memory 103 is unlocked (S508).

On the other hand, for the image processing in which all "PERFORMANCE COMPLETION INFORMATION" are not "ALREADY PERFORMED", the syntax analysis unit 101 determines that the image processing is not practicable (NO in S504 and S503).

S502 to S508 are repeated for all image processing included in the dependent information field (S509). S501 to S509 are repeated for all the macro blocks. When the repetition of S501 to S509 is completed (YES in S510), an area where dependent information 103B is stored in the memory 103 is unlocked, and the dependency relationship solving processing (1) is ended (S511).

Figure 6:
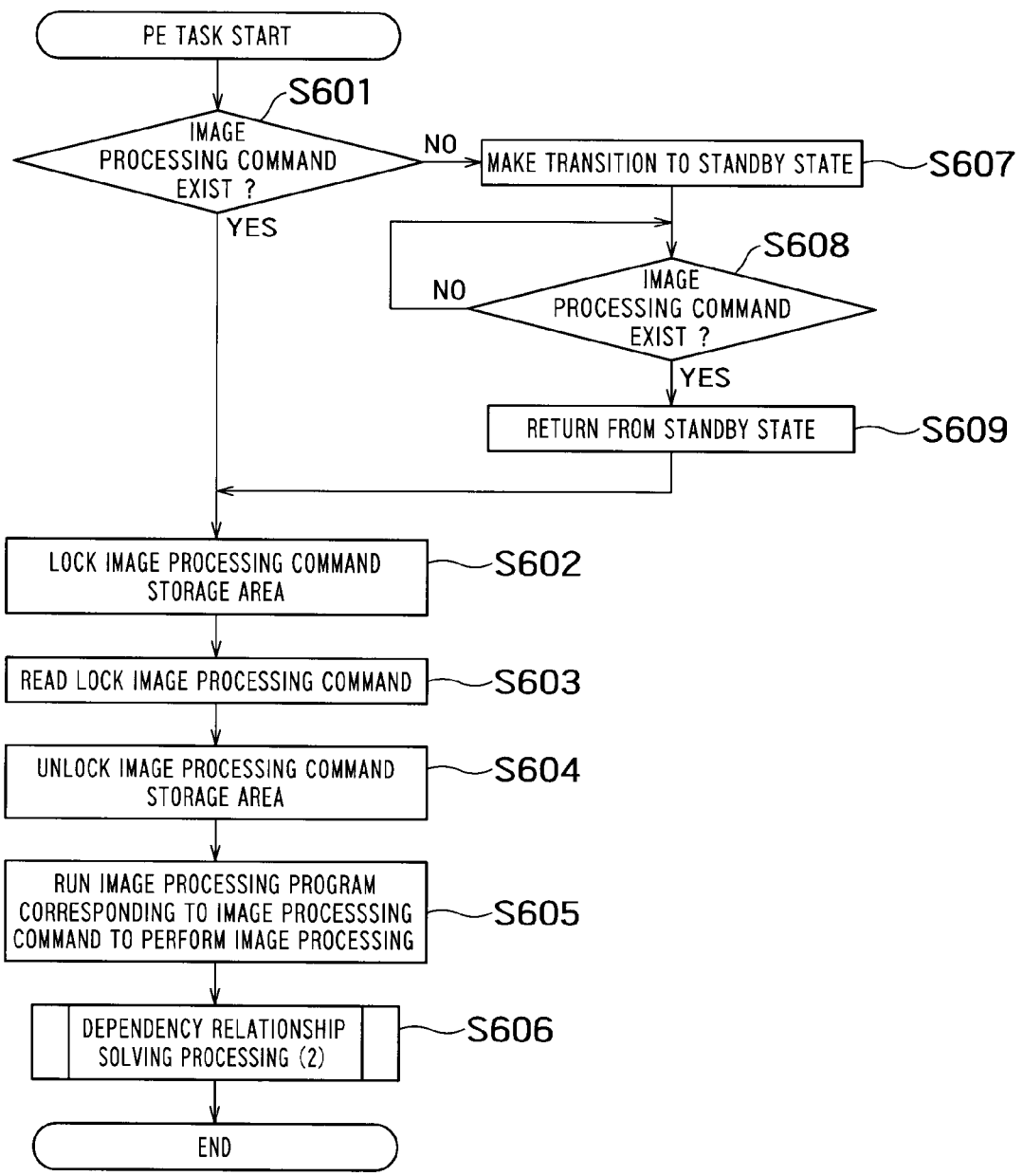
FIG. 6 is a flowchart showing a processing procedure of image processing units 102A to 102D in PE task processing according to an embodiment of the present invention.

FIG. 6 is a flowchart showing a processing procedure of the image processing units in the PE task processing according to an embodiment of the present invention. Each of the image processing units 102A to 102D runs the PE task program 103D to perform the PE task processing. The image processing units 102A to 102D concurrently run the PE task program 103D.

When the image processing command 103A exists in the memory 103 (YES in S601), the image processing command 103A stored in the memory 103 is locked (S602). S602 is performed to prevent other image processing units (for example, the image processing units 102B to 102D when the image processing unit 102A performs the PE task) from reading and writing the image processing command 103A in performing the PE task processing. Then, the image processing command 103A is read (S603). Then, the image processing command 103A of the memory 103 is unlocked (S604). The image processing program 103E corresponding to the image processing command 103A read in S603 is run to perform the image processing (S605). After the image processing is completed, the dependency relationship solving processing (2) described later is performed (S606).

On the other hand, when the image processing command 103A does not exist (NO in S601), the processing procedure makes transition to a standby state (S607). The standby state is retained until the image processing command 103A is written (NO in S608). After the image processing command 103A is written (YES in S606), the processing procedure is returned from the standby state (S609). Then, S602 to S606 are performed.

Figure 7:
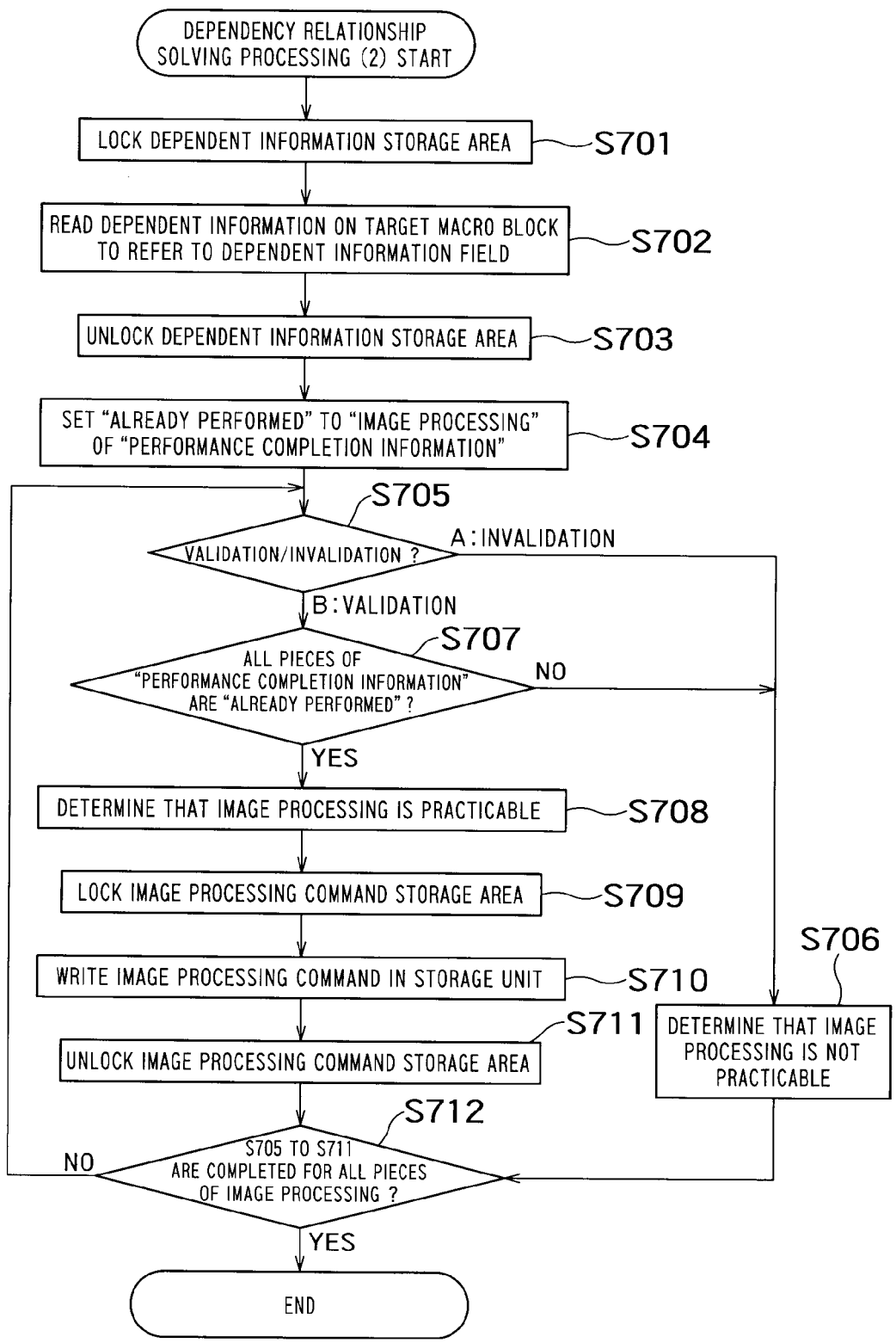
FIG. 7 is a flowchart showing a processing procedure of image processing units 102A to 102D in dependency relationship solving processing (2) according to an embodiment of the present invention.

FIG. 7 is a flowchart showing a processing procedure of the image processing units in the dependency relationship solving processing (2) according to an embodiment of the present invention. The image processing units 102A to 102D run the dependency relationship solving program 103H to perform the dependency relationship solving processing (2).

The dependent information 103B stored in the memory 103 is locked (S701). S701 is performed to prevent the syntax analysis unit 101 or other image processing units (for example, the image processing units 102B to 102D when the image processing unit 102A performs the dependency relationship solving processing (2)) from reading and writing the dependent information 103B in performing the dependency relationship solving processing (2). Then, the dependent information 103B of the macro block to which the image processing should be performed is read to refer to the dependent information field (S702). Then, the dependent information 103B of the memory 103 is unlocked (S703).

The "ALREADY PERFORMED" is set to the "IMAGE PROCESSING" of the "PERFORMANCE COMPLETION INFORMATION" corresponding to the image processing performed in S603 (S704). At this point, the "ALREADY PERFORMED" is set to not only the "IMAGE PROCESSING" of the "PERFORMANCE COMPLETION INFORMATION" of the dependent information 103B read in S701 but also the "IMAGE PROCESSING" of the "PERFORMANCE COMPLETION INFORMATION" included in the dependent information fields of dependent information 103B of other macro blocks. The setting is performed to all the macro blocks having the dependency relationships with the image processing performed to the target macro block of the image processing. S704 is performed based on the algorithm of the dependency relationship solving program 103H. Then, the image processing units 102A to 102D determine whether the validation or the invalidation is set to the "VALIDATION/INVALIDATION" (S705).

For the image processing in which the "INVALIDATION" is set (A: INVALIDATION in S705), the image processing units 102A to 102D determine that the image processing is not practicable (S706).

On the other hand, for the image processing in which the "VALIDATION" is set (B: VALIDATION in S705), the image processing units 102A to 102D determine whether or not all "PERFORMANCE COMPLETION INFORMATION" are "ALREADY PERFORMED" while the dependent information field is viewed in the column direction (S707).

For the image processing in which all "PERFORMANCE COMPLETION INFORMATION" are "ALREADY PERFORMED", the image processing units 102A to 102D determine that the image processing is practicable (YES in S707 and S708). Then, the image processing command 103A of the memory 103 is unlocked (S709). S709 is performed to prevent other image processing units (for example, the image processing units 102B to 102D when the image processing unit 102A performs the dependency relationship solving processing (2)) from reading and writing the image processing command 103A in performing the dependency relationship solving processing (2). Then, the image processing command is written in the memory 103 (S710). Then, the image processing command 103A of the memory 103 is unlocked (S711).

On the other hand, for the image processing in which all "performance completion information" are not "already performed", the image processing units 102A to 102D determine that the image processing is not practicable (NO in S707 and S706).

S705 to S711 are repeated for all image processing included in one dependent information field, and the dependency relationship solving processing (2) is ended when the repetition is completed for all image processing (YES in S712).

In accordance with an embodiment of the present invention, the image processing command 103A is written in the memory 103 based on the dependency relationship among the plurality of image processing and the dependent information 103B including the performance completion information of the image processing having the dependency relationship. Therefore, only the practicable image processing command 103A is written in the memory. In other words, the image processing units 102A to 102D in which the image processing is not being performed can immediately perform the image processing command 103A of the memory 103. Accordingly, the parallel processing can efficiently be performed.

Additionally, the "PERFORMANCE COMPLETION INFORMATION" is managed in the unit of image processing of each macro block based on the header information on the moving image coding stream. Therefore, the parallelism existing among the image processing in the macro block is utilized at a maximum, and it is not necessary that the particular processing be rigidly not allocated to the image processing units 102A to 102D. Accordingly, the parallel processing can efficiently be performed.

Additionally, the "VALIDATION/INVALIDATION" of the image processing is set in each macro block, so that different image processing procedures can be performed among the macro blocks.

When the image processing command 103A does not exists, the image processing units 102A to 102D make transition to the standby state to reduce power consumption of the image processing apparatus.

What is claimed is:

1. An image processing apparatus comprising:
a memory configured to store a plurality of image processing commands;
a dependent information producing unit configured to produce dependent information in each image data block that is a target for first image processing, the dependent information comprising completion information indicating whether second image processing is completed, the second image processing corresponding to a kind of the first image processing and to be completed before the first image processing is performed;
a dependency relationship solving unit, if the completion information indicates that the second image processing is completed, configured to determine the first image processing which should be performed after the second image processing is completed as practicable processing, and to write an image processing command of the practicable first image processing in the memory; and
a plurality of image processing units configured to perform the first image processing to the image data block based on the image processing command, wherein
the dependent information producing unit produces dependent information further comprising validation information indicating that the first image processing is valid or invalid, the validation information corresponding to the kind of first image processing,
when the validation information indicates that the first image processing is valid, the dependency relationship solving unit writes the image processing command of the first image processing which is determined as practicable processing and corresponds to the validation information indicating that the first image processing is valid in the memory, and
when the validation information indicates that the first image processing is invalid for at least one of the image processing units, the at least one image processing unit makes a transition to a standby state.

2. The apparatus of claim 1, wherein the dependency relationship solving unit updates the dependent information based on an image processing result produced by the image processing units.

3. The apparatus of claim 2, wherein each of the image processing units checks whether the image processing command is stored in the memory and makes a transition to a standby state when the image processing command is not stored in the memory.

4. The apparatus of claim 3, wherein each of the image processing units checks whether the image processing command is stored in the memory and cancels the standby state when the image processing command is stored in the memory while the image processing unit is in the standby state.

5. The apparatus of claim 1, wherein each of the image processing units checks whether the image processing command is stored in the memory and makes a transition to the standby state when the image processing command is not stored in the memory.

6. The apparatus of claim 5, wherein each of the image processing units checks whether the image processing command is stored in the memory and cancels the standby state when the image processing command is stored in the memory while the image processing unit is in the standby state.

7. An image processing method for performing a plurality of image processings in each image data block, the method comprising:
producing dependent information in each image data block that is a target for first image processing, the dependent information comprising completion information indicating whether second image processing is completed, the second image processing corresponding to a kind of the first image processing and to be completed before the first image processing is performed;
determining the first image processing which should be performed after the second image processing is completed as practicable processing if the completion information indicates that the second image processing is completed,
writing an image processing command of the practicable first image processing in a memory; and
performing the first image processing based on the image processing command, wherein
the dependent information further comprises validation information indicating that the first image processing is valid or invalid, the validation information corresponding to the kind of first image processing,
in writing the image processing command, when the validation information indicates that the first image processing is valid, the image processing command of the first image processing which is determined as practicable processing and corresponds to the validation information indicating that the first image processing is valid is written in the memory, and
when the validation information indicates that the first image processing is invalid, a transition to a standby state is made.

8. The method of claim 7, wherein the dependent information is updated based on a result of the first image processing.

9. The method of claim 8, wherein the transition to a standby state is made when the image processing command is not stored in the memory.

10. The method of claim 9, wherein the standby state is canceled when the image processing command is stored in the memory during the standby state.

11. The method of claim 7, wherein the transition to a standby state is made when the image processing command is not stored in the memory.

12. The method of claim 11, wherein the standby state is canceled when the image processing command is stored in the memory during the standby state.

13. A non-transitory computer-readable storage medium configured to store a program comprising instructions for:
producing dependent information in each image data block that is a target for first image processing, the dependent information comprising completion information indicating whether second image processing is completed, the second image processing corresponding to a kind of the first image processing and to be completed before the first image processing is performed;
determining the first image processing which should be performed after the second image processing is completed as practicable processing if the completion information indicates the that second image processing is completed;

writing an image processing command of the practicable first image processing in a memory; and performing the first image processing based on the image processing command, wherein the dependent information further comprises validation information indicating that the first image processing is valid or invalid, the validation information corresponding to the kind of first image processing, in writing the image processing command, when the validation information indicates that the first image processing is valid, the image processing command of the first image processing which is determined as practicable processing and corresponds to the validation information indicating that the first image processing is valid is written in the memory, and when the validation information indicates that the first image processing is invalid, a transition to a standby state is made.

* * * * *